(12) United States Patent
Yasukouchi et al.

(10) Patent No.: US 7,097,235 B2
(45) Date of Patent: Aug. 29, 2006

(54) IMPACT ENERGY ABSORBING STRUCTURE OF VEHICLE FRAME MEMBER

(75) Inventors: Satoshi Yasukouchi, Hadano (JP); Hiroyuki Tachizawa, Sagamihara (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/028,516

(22) Filed: Jan. 5, 2005

(65) Prior Publication Data

US 2005/0151392 A1 Jul. 14, 2005

(30) Foreign Application Priority Data

Jan. 13, 2004 (JP) ............................ P2004-005517

(51) Int. Cl.
*B62D 21/00* (2006.01)
(52) U.S. Cl. ................................. 296/187.03
(58) Field of Classification Search ........... 296/187.03, 296/187.01, 187.08, 187.09, 187.1, 203.01, 296/204, 203.02; 180/311
See application file for complete search history.

(56) References Cited

U.S. PATENT DOCUMENTS

| | | | | |
|---|---|---|---|---|
| 4,194,763 A | * | 3/1980 | Reidelbach et al. | 280/784 |
| 4,684,151 A | * | 8/1987 | Drewek | 280/784 |
| 4,822,096 A | * | 4/1989 | Fujii | 296/203.02 |
| 5,118,160 A | * | 6/1992 | Kitagawa et al. | 296/187.03 |
| 5,370,438 A | * | 12/1994 | Mori et al. | 296/203.02 |
| 6,655,728 B1 | * | 12/2003 | Sano et al. | 296/187.09 |
| 6,942,262 B1 | * | 9/2005 | Glasgow et al. | 293/132 |
| 2001/0013705 A1 | | 8/2001 | Okamura et al. | |
| 2001/0019214 A1 | | 9/2001 | Takahara | |
| 2001/0019215 A1 | | 9/2001 | Takahara | |
| 2004/0201256 A1 | * | 10/2004 | Caliskan et al. | 296/187.08 |
| 2005/0067860 A1 | * | 3/2005 | Makita et al. | 296/203.02 |
| 2005/0082878 A1 | * | 4/2005 | Yamada et al. | 296/204 |

FOREIGN PATENT DOCUMENTS

| | | | |
|---|---|---|---|
| EP | 0 878 379 A1 | 11/1998 | |
| JP | 4050083 | * 2/1992 | ................. 296/204 |
| JP | 10-244955 | 9/1998 | |
| JP | 2000-185611 A | 7/2000 | |

\* cited by examiner

*Primary Examiner*—H Gutman
(74) *Attorney, Agent, or Firm*—McDermott Will & Emery LLP

(57) ABSTRACT

An impact energy absorbing structure of a frame member of a vehicle, which includes: a first bead formed on the frame member, which promotes bending deformation of the frame member when an impact load is inputted in an axial direction thereof; a second bead formed on the frame member, which promotes axial deformation of the frame member when the impact load is inputted in the axial direction thereof; and a reinforcement panel attached to the frame member. The frame member is configured to accommodate the reinforcement panel both in a first position beside the first bead and on the side from which the impact load is inputted, and in a second position where the first bead is reinforced with the reinforcement panel.

7 Claims, 7 Drawing Sheets

IMPACT ENERGY ABSORBING STRUCTURE OF VEHICLE FRAME MEMBER

BACKGROUND OF THE INVENTION

1. Field of Invention

The present invention relates to an impact energy absorbing structure of a structural frame member of a vehicle, such as an automobile.

2. Description of Related Art

Due to the differences in body weight and in engine specifications, reaction forces, deformation modes, crushing characteristics and the like of vehicle structural frame members at frontal collision of the vehicle, are different from one vehicle to another, depending on a required collision performance of the vehicle.

In Japanese Patent Application Laid-open Publication No. 10-244955, differences in required reaction force characteristics between vehicle models, are dealt with by changing plate thickness, material and the like of the frame member, or by adding a reinforcing member such as a reinforcement panel.

SUMMARY OF THE INVENTION

However, changing the material, the plate thickness and the like of the frame member, or adding the reinforcing member to the frame member, results in cost increase related to the increased number of parts or new molds.

It is an object of the present invention to provide an impact energy absorbing structure of a frame member, which provides various reaction forces or deformation modes at collision with the same frame member, without additionally providing a reinforcing member for each vehicle model.

An aspect of the present invention is an impact energy absorbing structure of a frame member of a vehicle, comprising: a first element provided on the frame member for promoting bending deformation of the frame member when an impact load is inputted in an axial direction thereof; a second element provided on the frame member for promoting axial deformation of the frame member when the impact load is inputted in the axial direction thereof; and a reinforcement panel attached to the frame member, wherein the frame member is configured to accommodate the reinforcement panel in a first position beside the first element and on the side from which the impact load is inputted, and in a second position where the first element is reinforced with the reinforcement panel.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
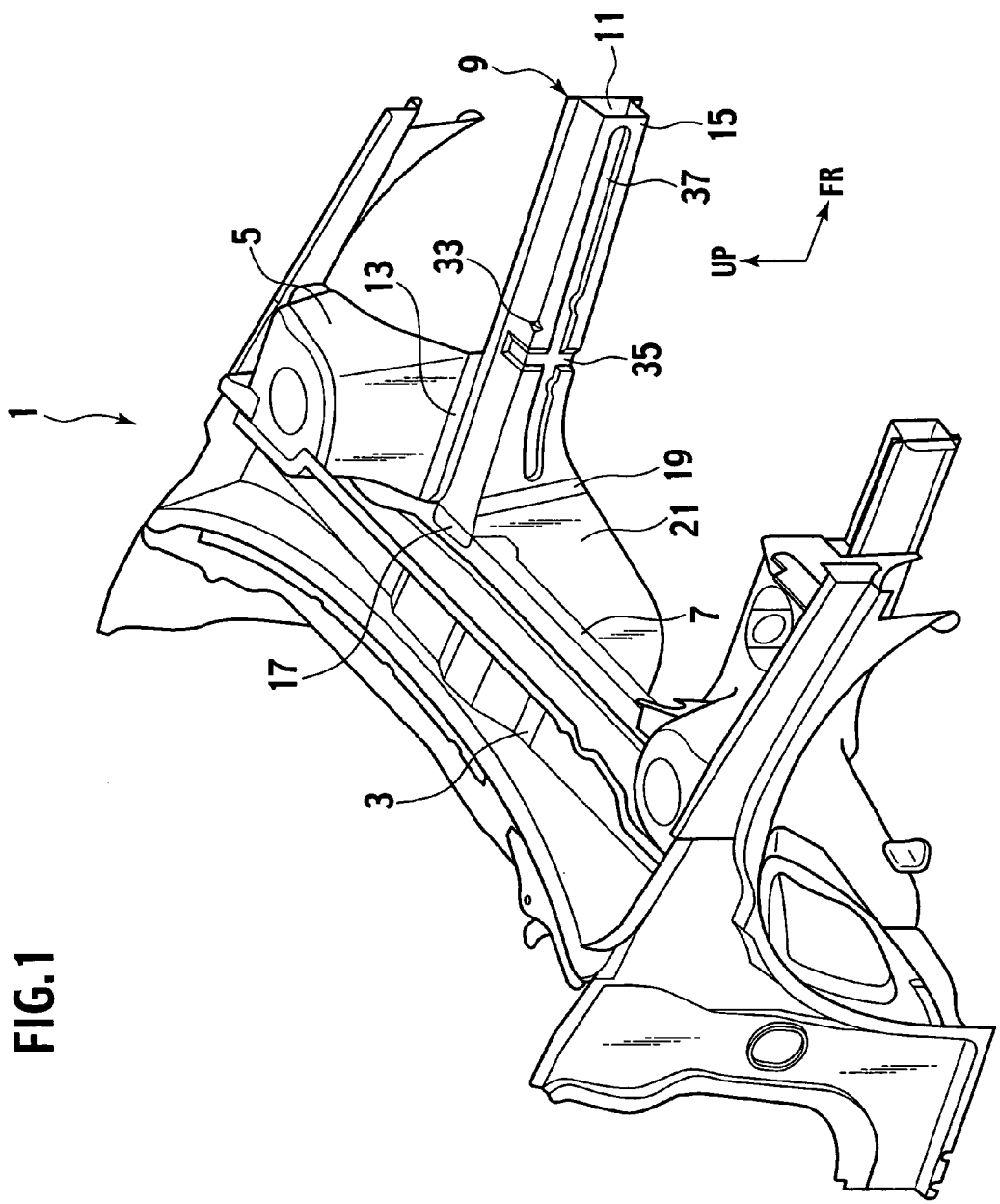
FIG. 1 is a perspective view of a front portion of a vehicle body with a frame member having an impact energy absorbing structure according to an embodiment of the present invention.

An embodiment of the present invention will be explained below with reference to the drawings, wherein like members are designated by like reference characters.

First of all, a description will be given of a front side member on which a bead for inducing and promoting a bending deformation thereof (hereinafter referred to as a bending deformation promoting bead) and a bead for inducing and promoting an axial deformation or buckling thereof (hereinafter referred to as an axial deformation promoting bead) are formed, and on which a reinforcement panel is arranged corresponding to the bending deformation promoting bead. This front side member can be mounted mainly on a vehicle lighter in weight.

As shown in FIG. 1, in a front portion of a vehicle body 1, a cowl box 3 is extended in the vehicle transverse direction. Strut towers 5 are arranged in front of the right and left ends of the cowl box 3, respectively. In addition, a cross member 7 is extended in the vehicle transverse direction underneath the cowl box 3. Each of side members 9 is connected to one of the strut towers 5 and the cross member 7. A flange 13 formed in the rear portion of a closing plate 11 constituting the front side member 9 is connected to a transversely inner side face of the strut tower 5. A flange 17 at the rear end of a front side member main body 15 is placed on and fixed to the upper face of the cross member 7. Furthermore, a flange 19 at the rear end of the transversely inner side face of the front side member main body 15 is connected to an extension member 21.

Figure 2:
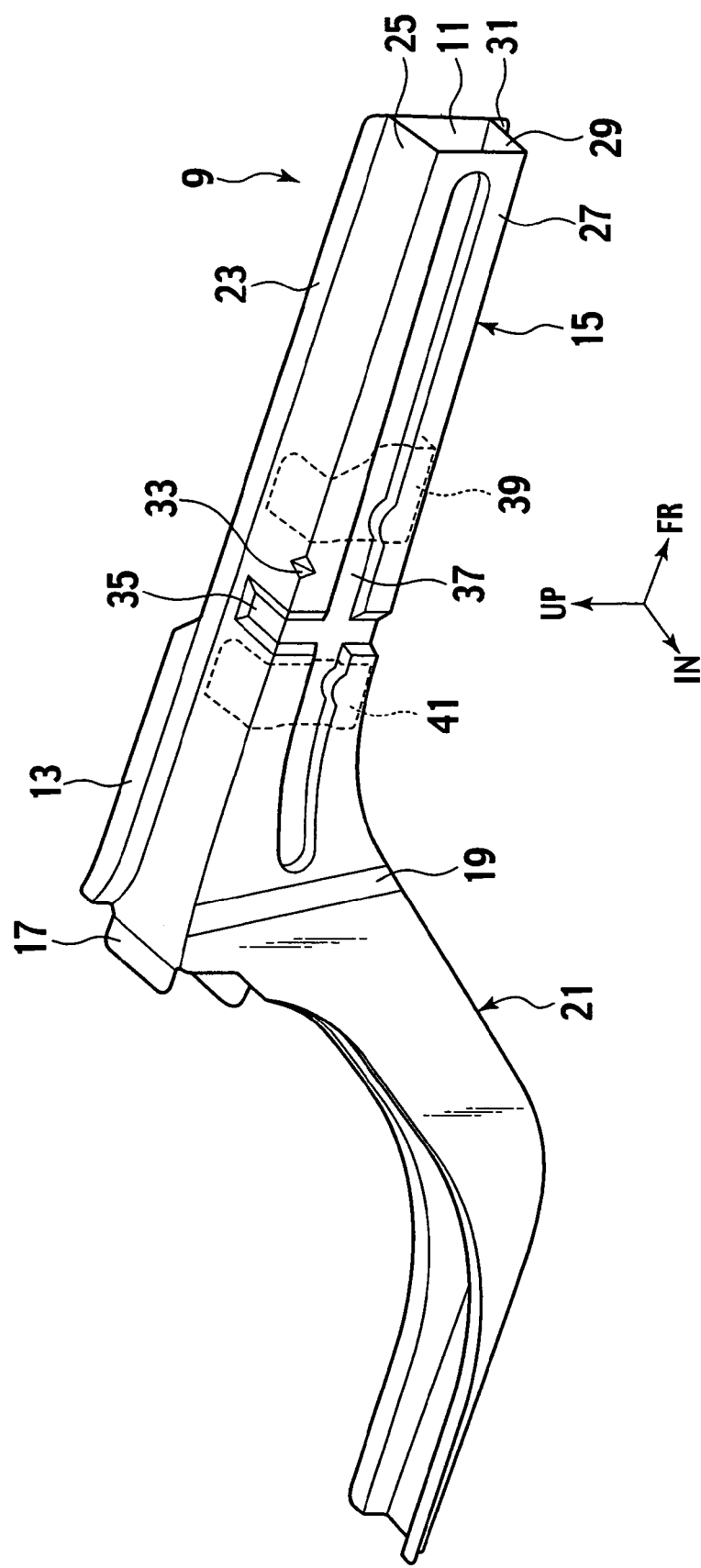
FIG. 2 is an enlarged perspective view showing a front side member and an extension member of FIG. 1.

As shown in FIG. 2, the front side member 9 has a closed section structure constituted of the front side member main body 15 formed in a channel shape (or in U-shape in cross section); and the closing plate 11 closing an opening of the front side member main body 15. In addition, the front side member main body 15 is formed by bending to have: an upwardly extending upper end flange 23 arranged in the upper end of the front side member main body 15, an upper wall 25 extending from the lower end of the upper end flange 23 inward in the vehicle transverse direction; a side wall 27 extending downward from a transversely inner edge of the upper wall 25; a lower wall 29 extending outward in the vehicle transverse direction from the lower end of the side wall 27; and a lower end flange 31 extending downward from a transversely outer edge of the lower wall 29. The closing plate 11 is connected at the upper end flange 23 and the lower end flange 31 to the front side member main body 15.

The extension member 21 is connected with the rear end of the front side member main body 15. The rear portion of the extension member 21 is connected with a front floor panel, which is not illustrated.

In a transversely inner and upper corner portion of the front side member main body 15, almost in the middle of the front side member main body 15 in the vehicle longitudinal direction, a notch (or a triangle bead) 33 is formed as a bending deformation promoting bead, which is depressed toward the inside of the front side member main body 15. Furthermore, in a position on the rear side of the notch 33, a rectangular depression 35 is formed as an axial deformation promoting bead extending in a vertical direction across the inner side face of the front side member 15 and over the top and bottom faces thereof. A connection bead 37 is formed on the transversely inner side face of the front side member main body 15 to extend in the vehicle longitudinal direction or in a direction of transmission of the impact load. This connection bead 37 is formed to cross the axial deformation promoting bead 35 in a cruciform shape when viewed from the side thereof.

Furthermore, as shown by broken lines in FIG. 2, a front reinforcement panel 39 and a rear reinforcement panel 41, both of which are formed in a channel shape in cross section, are connected to the back surface (or inside surface) of the front side member main body 15. This front reinforcement panel 39 is arranged in a position on the front side of the notch 33 in the vehicle longitudinal direction when viewed from the side thereof. The rear reinforcement panel 41 is arranged in a position on the rear of the axial deformation promoting bead 35 in the vehicle longitudinal direction when viewed from the side thereof.

A description will be given of a transmission pathway through which an impact load inputted to the front side member 9 from an obstacle 43 in front of the vehicle is transmitted.

Figure 3:
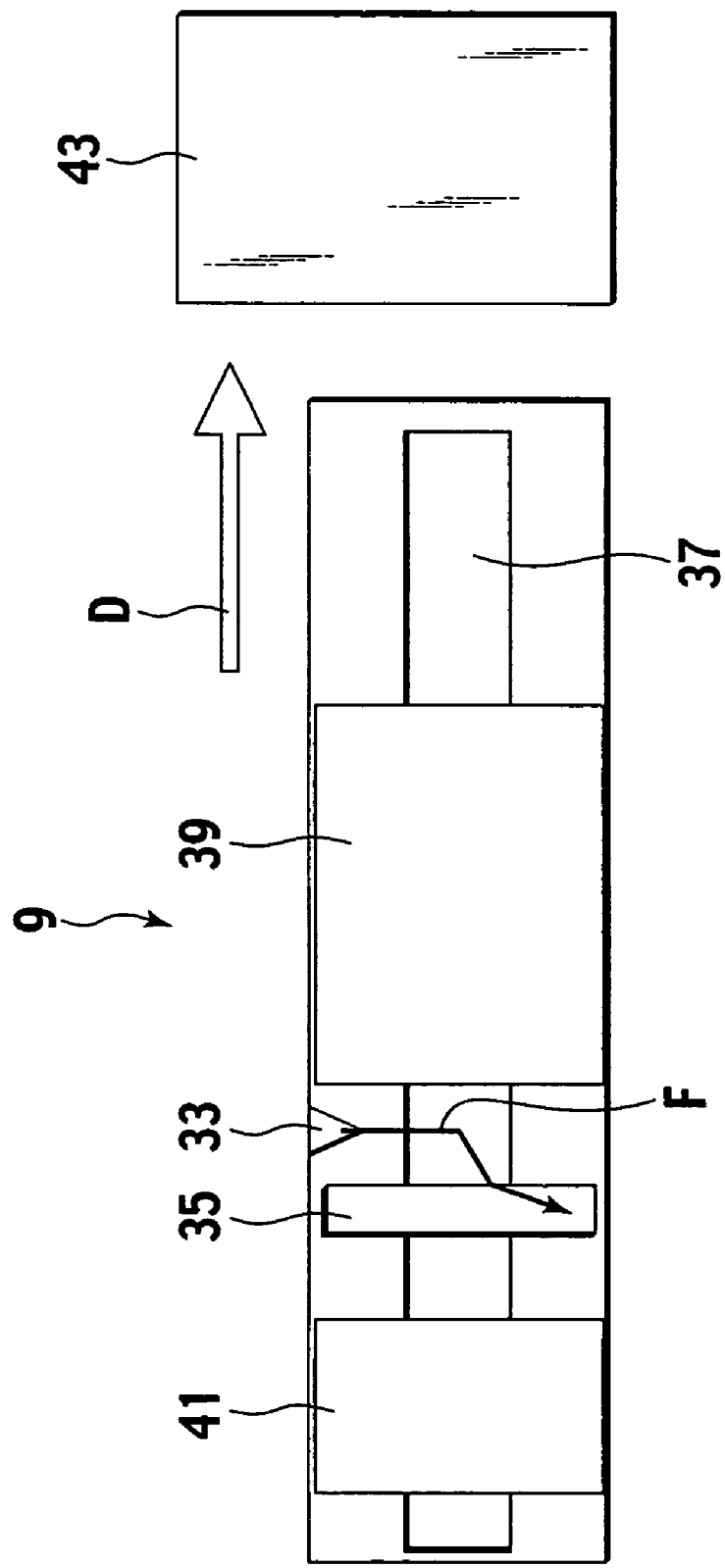
FIG. 3 is a schematic diagram showing a transmission pathway of an impact load in the front side member of FIG. 1.
Figure 4:
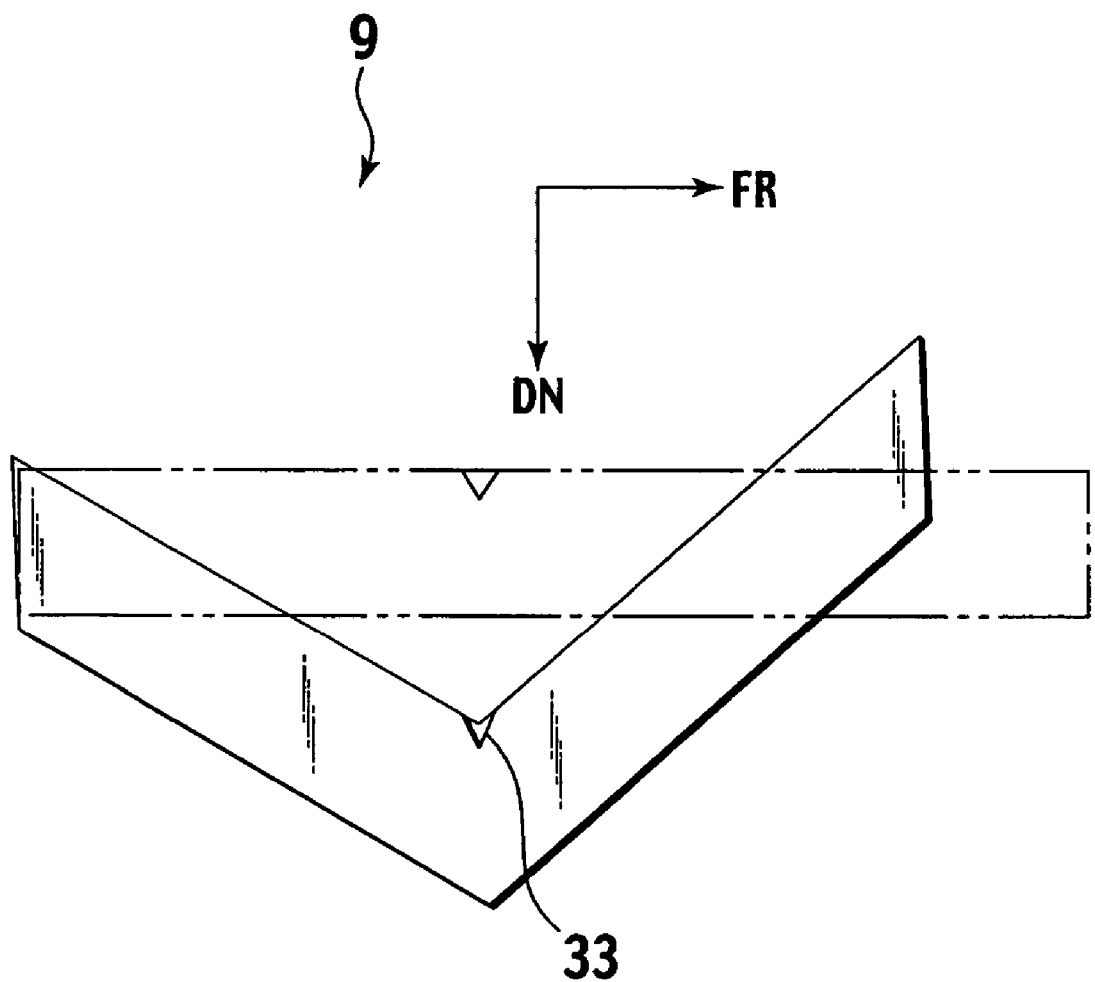
FIG. 4 is a schematic diagram showing a state where the front side member of FIG. 1 is bent and deformed.

First of all, as shown in FIGS. 3 and 4, when the vehicle runs in the traveling direction D and collides against the obstacle 43, the impact load F is inputted from this obstacle 43 to the front side member 9 in an axial direction of the front side member 9. The front portion of the front side member 9 is reinforced with the front reinforcement panel 39. Therefore, the impact load F is transmitted from the notch 33 to the lower portion of the axial deformation promoting bead 35 through the connection bead 37.

Thereafter, as shown by solid lines in FIG. 4, a bending deformation begins at the notch 33 which is formed to have a low strength and to be a vulnerable part of the front side member 9. The front side member 9 is deformed into V shape with the middle portion thereof bent downward when viewed from the side thereof. In this case, an average reaction force of the front side member 9 becomes relatively small. The deformation mode of the front side member 9 is also influenced by a location of the center of gravity of the passenger compartment and the rear part of the vehicle, a shape of the front end portion of the vehicle colliding against the obstacle 43, a point of collision of the vehicle and the obstacle 43, and the like.

Next, a description will be given of a structure of the front side member which absorbs the impact energy by axially deforming (buckling, or collapsing) in the vehicle longitudinal direction at a frontal collision. The same reference numerals are affixed to the same constituent components as the aforementioned structure has, and descriptions for the same constituent components as the aforementioned structure has will be omitted. Incidentally, this front side member can be mounted mainly on a vehicle heavier in weight.

Figure 5:
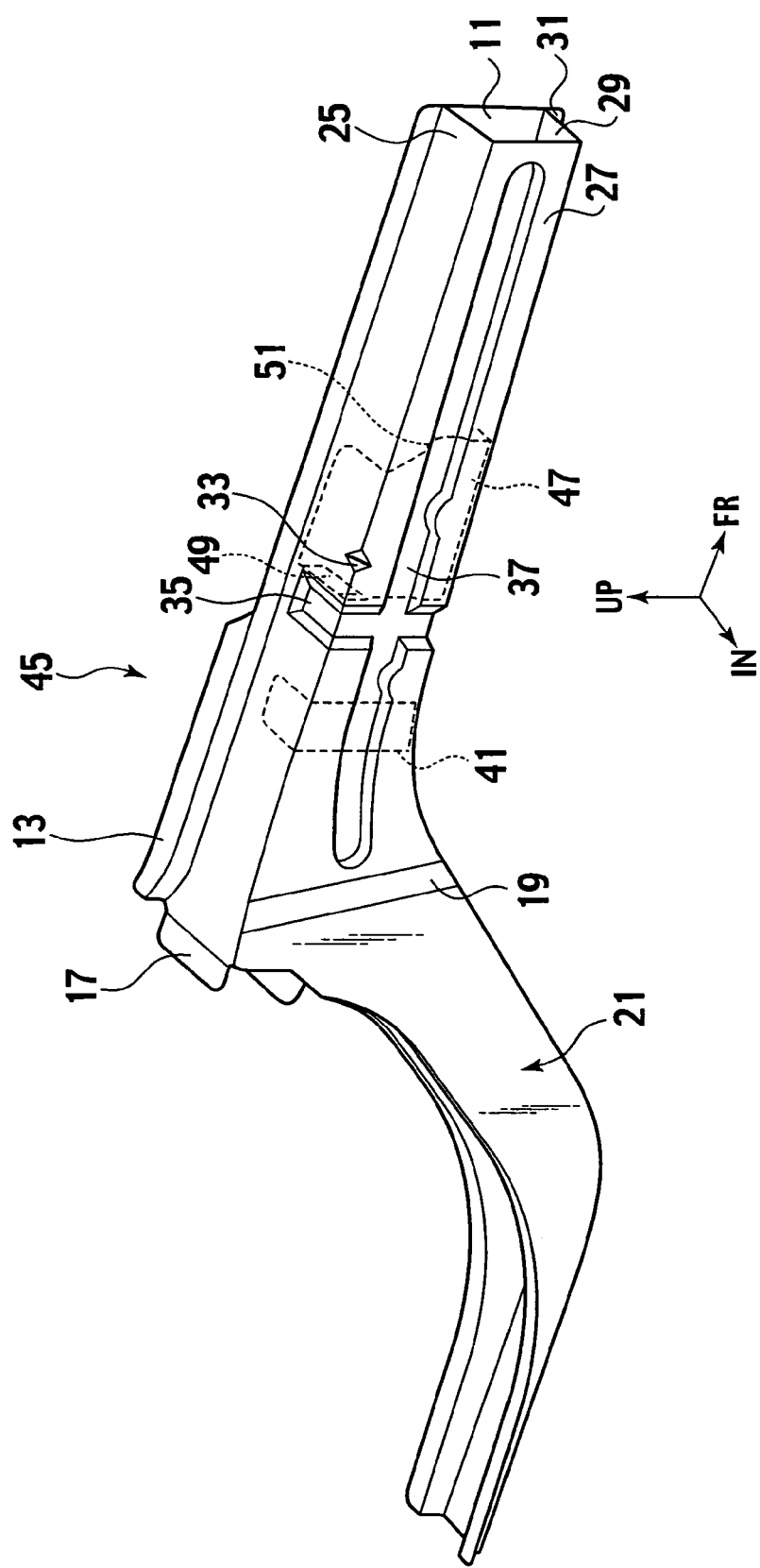
FIG. 5 is a perspective view of another front side member according to the embodiment of the present invention.

Another front side member 45 in FIG. 5 is different from the front side member 9, which has been described, in the length of and the arrangement position of the front reinforcement panel 47.

In other words, as shown in FIG. 5, a rear edge 49 of the front reinforcement panel 47 is located between the axial deformation promoting bead 35 and the notch 33, and a front edge 51 of the front reinforcement panel 47 is located in a position on the front side of the notch 33. The front reinforcement panel 47 is extended in an area covering the notch 33 when viewed from the side. All the structures/members other than the front reinforcement panel 47 are the same as those of the front side member previously described. The front side members 9 and 45 are formed of the same material with the same plate thickness.

A description will be given of a transmission pathway through which an impact load inputted into the front side member 45 from the obstacle 43 arranged in front of the vehicle is transmitted.

Figure 6:
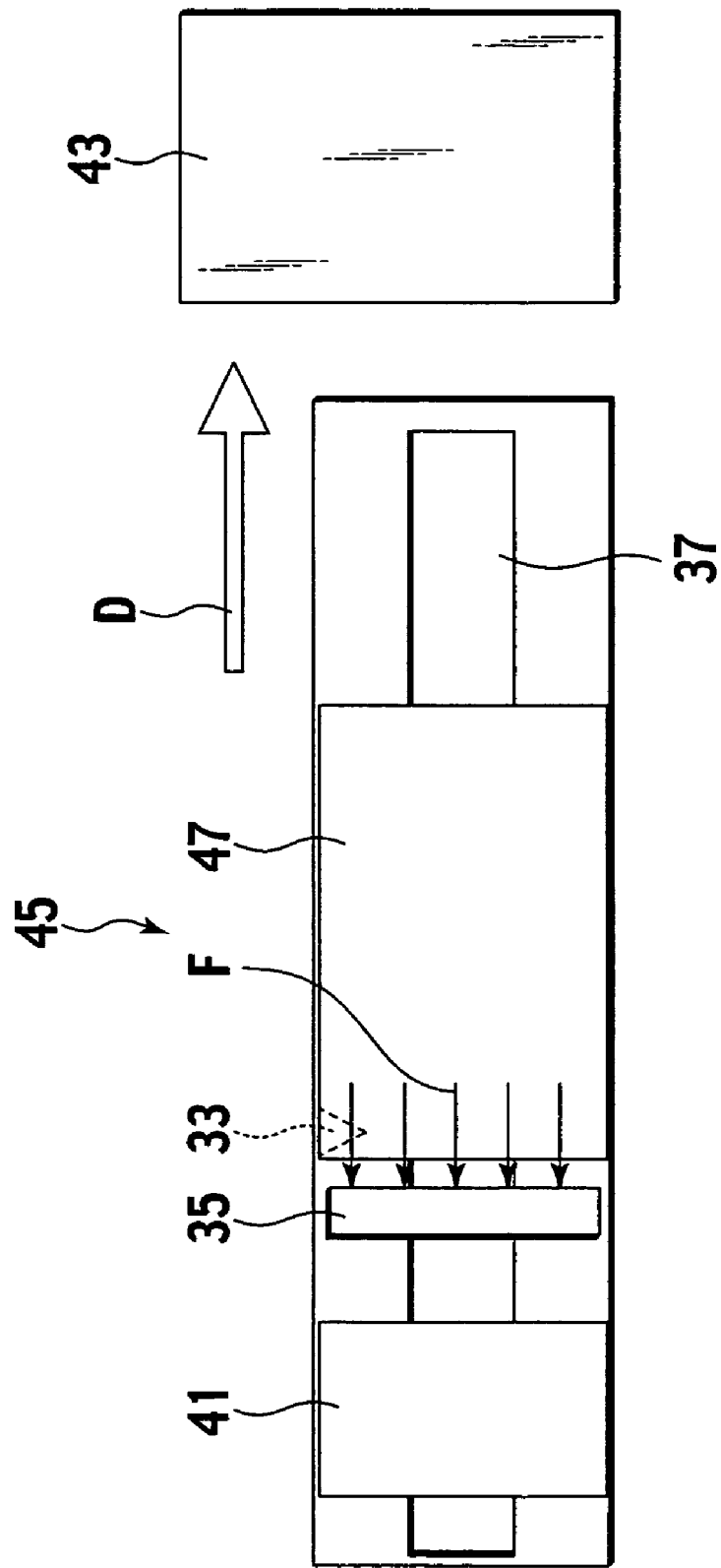
FIG. 6 is a schematic diagram showing a transmission pathway of an impact load in the front side member of FIG. 5.
Figure 7:
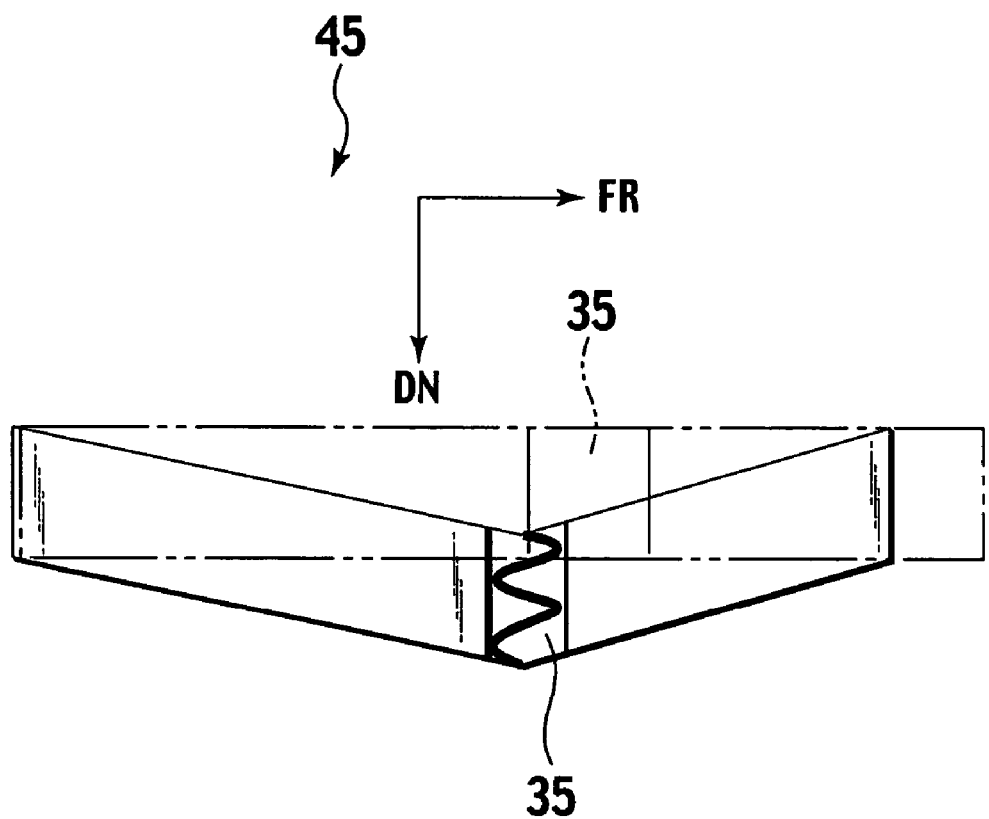
FIG. 7 is a schematic diagram showing a state where the front side member of FIG. 6 is bent and deformed.

First of all, as shown in FIGS. 6 and 7, the impact load F is inputted from the obstacle 43 to the front side member 45 in the axial direction of the front side member 45. Since the front portion of the front side member 45, including the area of the notch 33, is reinforced with the front reinforcement panel 47, the impact load F is transmitted directly to the axial deformation promoting bead 35 through the front reinforcement panel 47.

Thereafter, as shown by solid lines in FIG. 7, an axial deformation begins at the axial deformation promoting bead 35. The front side member 45 is deformed in the axial direction thereof with the middle part thereof compressed. In this case, an average reaction force of the front side member 45 becomes relatively large.

According to the impact energy absorbing structure of the present embodiment, functions and effects which will be described below can be obtained.

In a case where the front side member 9 is configured to have a bending deformation beginning at the notch 33, the front reinforcement panel 39 is arranged in a position on the front side of the notch 33 and on the side from which the impact load F is inputted (see FIG. 3). On the other hand, in a case where the front side member 45 is configured to have an axial deformation beginning at the axial deformation promoting bead 35, the front reinforcement panel 47 is extended in an area in the front side member 45 covering the notch 33. Therefore, an average reaction force or a deformation mode of the front side member 9 or 45 at a frontal collision of the vehicle 1 can be controlled, only by changing the size of or the arrangement location of the respective front reinforcement panels 39 and 47.

Specifically, in a case where the front reinforcement panel 39 is arranged in the position on the front side of the notch 33 and on the side from which the impact load is inputted, the impact load at the frontal collision is transmitted to the area of the notch 33 and stress of the impact load concentrates on the notch 33. Thereby, the bending deformation of the font side member 9 begins at the notch 33. On the other hand, in a case where the front reinforcement panel 47 is arranged in the area in the front side member 45 covering the notch 33, the impact load inputted into the front side member 45 is transmitted to the area of the axial deformation promoting bead 35. That is because the front reinforcement panel 47 is superimposed on the notch 33 so that the front side member 45 is reinforced and less prone to be bent and deformed around the notch 33. Accordingly, stress of the impact load concentrates on the axial deformation promoting bead 35, and the front side member 45 is deformed with the axial deformation promoting bead 35 compressed.

In this way, with regard to the front side members 9 and 45 formed of the same material with the same plate thickness, a reaction force characteristic or a deformation mode of each of the front side members 9 and 45, which is required to achieve the vehicle safety performance, can be controlled without providing an additional reinforcing member for each vehicle model. This eliminates the necessity for providing a new mold for press molding of the front side members 9 and 45, and reduces the number of types of the front side members, thereby reducing cost.

In addition, the bending deformation promoting bead is provided simply by forming the notch 33 in the corner portion of the front side member 9. Therefore, the bending deformation of the front side member 9 can be easily and surely obtained.

The axial deformation promoting bead 35 is a bead which is formed on the planar side wall 27 constituting the front side members 9 and 45, and has a rectangular shape when viewed from the side. It is easy to form the axial deformation promoting bead 35, and to change the size of the bead.

The front reinforcement panels 39 and 47 are arranged inside the front side members 9 and 45. Therefore, none of the front reinforcement panels 39 and 47 will project into the engine compartments, saving the spaces thereof.

Furthermore, the connection bead 37, serving as the transmission pathway through which the impact load F is transmitted from the notch 33 to the axial deformation promoting bead 35, is formed on the planar side wall 27 constituting the front side members 9 and 45 and is extended in a longitudinal direction thereof. Therefore, the impact load F is transmitted smoothly.

The preferred embodiment described herein is illustrative and not restrictive, and the invention may be practiced or embodied in other ways without departing from the spirit or essential character thereof. Although the notch 33 as the bending deformation promoting bead is formed only in the upper corner portion of each of the front side members 9 and 45 in the aforementioned embodiments, the present invention is not limited to these embodiments. The notch 33 may be formed in the lower corner portion of each of the front side members 9 and 45. Otherwise, the notch 33 may be formed in both the upper and lower corner portions of each of the front side members 9 and 45. Further, the reinforcement panels 39 and 47 may be the same to be commonly used for both front side members 9 and 45. In this case, the front side members 9 and 45 are different only in the positions of the reinforcement panels 39 and 47. The scope of the invention being indicated by the claims, and all variations which come within the meaning of claims are intended to be embraced herein.

The present disclosure relates to subject matters contained in Japanese Patent Application No. 2004-005517, filed on Jan. 13, 2004, the disclosure of which is expressly incorporated herein by reference in its entirety.

What is claimed is:

1. An impact energy absorbing structure of a frame member of a vehicle, comprising:
   a first element provided on the frame member for promoting bending deformation of the frame member when an impact load is inputted in an axial direction thereof;
   a second element provided on the frame member for promoting axial deformation of the frame member when the impact load is inputted in the axial direction thereof, and
   a reinforcement panel attached to the frame member,
   wherein the frame member is configured to accommodate the reinforcement panel in a first position beside the first element and on the side from which the impact load is inputted, or a second position where the first element is reinforced with the reinforcement panel.

2. The impact energy absorbing structure according to claim 1, wherein
   the first element is a notch formed in a corner portion of the frame member extending in the axial direction thereof.

3. The impact energy absorbing structure according to claim 1, wherein
   the second element is a bead formed to extend across a side face of the frame member.

4. The impact energy absorbing structure according to claim 1, wherein
   the reinforcement panel is arranged inside the frame member.

5. The impact energy absorbing structure according to claim 1, further comprising:
   a third element through which the impact load is transmitted from the first element to the second element, the third element being formed on a side face of the frame member to extend in a direction of transmission of the impact load.

6. A method for controlling a reaction force or a deformation mode of a frame member of a vehicle, the method comprising:
   providing a first element for promoting bending deformation of the frame member when an impact load is inputted in an axial direction thereof, and a second element for promoting axial deformation of the frame member when the impact load is inputted in the axial direction thereof; and
   attaching a reinforcement panel to the frame member selectively in a first position beside the first element and on the side from which the impact load is inputted, or a second position where the first element is reinforced with the reinforcement panel.

7. An impact energy absorbing structure of a frame member of a vehicle, comprising:
   bending deformation promoting means provided on the frame member for promoting bending deformation of the frame member when an impact load is inputted in an axial direction thereof;
   axial deformation promoting means provided on the frame member for promoting axial deformation of the frame member when the impact load is inputted in the axial direction thereof; and
   a reinforcing means attached to the frame member,
   wherein the frame member is configured to accommodate the reinforcing means in a first position beside the bending deformation promoting means and on the side from which the impact load is inputted, or a second position where the bending deformation promoting means is reinforced with the reinforcing means.

* * * * *